(12) United States Patent
Tseng et al.

(10) Patent No.: US 11,067,126 B2
(45) Date of Patent: Jul. 20, 2021

(54) CIRCULATOR STRUCTURE AND SLIDER DEVICE USING THE SAME

(71) Applicant: TOYO AUTOMATION CO., LTD., Tainan (TW)

(72) Inventors: Kun-Cheng Tseng, Tainan (TW); Hsiang-Wei Chen, Tainan (TW); Ming-Chi Su, Tainan (TW)

(73) Assignee: TOYO AUTOMATION CO., LTD., Tainan (TW)

( * ) Notice: Subject to any disclaimer, the term of this patent is extended or adjusted under 35 U.S.C. 154(b) by 0 days.

(21) Appl. No.: 16/776,449

(22) Filed: Jan. 29, 2020

(65) Prior Publication Data
US 2021/0102578 A1    Apr. 8, 2021

(30) Foreign Application Priority Data
Oct. 2, 2019 (TW) ............................... 108135750.0

(51) Int. Cl.
*F16C 29/06* (2006.01)
*F16C 33/10* (2006.01)

(52) U.S. Cl.
CPC ...... *F16C 33/1025* (2013.01); *F16C 29/0638* (2013.01)

(58) Field of Classification Search
CPC .... F16C 29/06; F16C 29/0609; F16C 29/063; F16C 29/0638; F16C 29/64; F16C 29/654; F16C 29/0657; F16C 29/0669; F16C 29/0671; F16C 33/1025; F16C 33/1045
See application file for complete search history.

(56) References Cited

U.S. PATENT DOCUMENTS

| 2007/0237437 | A1* | 10/2007 | Lee | .......................... F16C 41/00 384/45 |
| 2008/0285898 | A1* | 11/2008 | Liu | ...................... F16C 33/6659 384/13 |
| 2017/0307011 | A1* | 10/2017 | Aoki | .................... F16C 29/0609 |

FOREIGN PATENT DOCUMENTS

| DE | 10049259 | A1 * | 4/2002 | .......... F16C 33/6659 |
| JP | 07317761 | A  * | 5/1999 | .......... F16C 29/0609 |
| JP | 62200016 | A  * | 7/1999 | .............. F16C 29/00 |
| JP | 2012219837 | A * | 12/2001 | .......... F16C 33/6611 |

* cited by examiner

*Primary Examiner* — Philip A Johnson
(74) *Attorney, Agent, or Firm* — CKC & Partners Co., LLC (57) ABSTRACT

A circulator structure includes a main body, a Y-like groove and two return channels. The main body has a first side surface, a second side surface and a through hole. The Y-like groove includes a first oil-guiding groove, a second oil-guiding groove and an oil distribution groove. The first oil-guiding groove and the second oil-guiding groove are located at two opposite sides of the through hole, and the oil distribution groove is located below the through hole. A lower guiding end of the first oil-guiding groove and a lower guiding end of the second oil-guiding groove are respectively connected to the oil distribution groove. The oil distribution groove has an upper end distribution opening connected to the through hole and a lower end distribution opening. The return channels are respectively located on two opposite sides of the first side surface and are connected to the lower end distribution opening.

15 Claims, 10 Drawing Sheets

FIG.10 ns, and a through hole, in which the first side surface is configured to be connected to the slider, and the through hole extends from the first side surface to the second side surface. The Y-like groove is recessed into the first side surface, in which the Y-like groove comprises a first oil-guiding groove, a second oil-guiding groove and an oil distribution groove. The first oil-guiding groove and the second oil-guiding groove are located at two opposite sides of the through hole, and the oil distribution groove is located below the through hole, and a lower guiding end of the first oil-guiding groove and a lower guiding end of the second oil-guiding groove are respectively connected to the oil distribution groove, and the oil distribution groove has an upper end distribution opening and a lower end distribution opening, the upper end distribution opening is located on an inner wall of the through hole. The return channels are recessed in the first side surface and are respectively located
CIRCULATOR STRUCTURE AND SLIDER DEVICE USING THE SAME

RELATED APPLICATIONS

This application claims priority to Taiwan Application Serial Number 108135750, filed on Oct. 2, 2019, which is incorporated herein by reference.

BACKGROUND

Field of Invention

The present invention relates to a circulator structure and its application. More particularly, the present invention relates to a circulator structure which can simplify the design of an oil passage of a slider device and an application thereof.

Description of Related Art

A supply of lubricating oil of a slider device is mainly used to prevent a problem of wear between a slider and a screw in the slider device, thus increasing the transmission efficiency of the slider device. Most of lubricating oil supply structures use additional branching blocks to connect an oil passage of the slider to an oil passage in an end cap.

However, the structure of the conventional slider device has complicated oil passages, which not only increases the number of components of the slider device, but also increases the difficulty of assembly of the slider device. Moreover, because the lubricating oil has to flow and pass through multiple components in the slider device, the problems of slow supply rates, uneven distribution, and oil leakage are likely to occur.

SUMMARY

The invention provides a circulator structure which can simplify and be integrated with oil passages in a slider device, thereby increasing the efficiency of oil supply and decreasing the overall manufacturing cost of the slider device.

According to the aforementioned object, a circulator structure is provided. The circulator structure is suitable to be disposed on a slider, so as to form an oil supply line with the slider. The circulator structure includes a main body, a Y-like groove and a pair of return channels. The main body has a first side surface, a second side surface opposite to the first side surface, and a through hole, in which the first side surface is configured to be connected to the slider, and the through hole extends from the first side surface to the second side surface. The Y-like groove is recessed into the first side surface, in which the Y-like groove comprises a first oil-guiding groove, a second oil-guiding groove and an oil distribution groove. The first oil-guiding groove and the second oil-guiding groove are located at two opposite sides of the through hole, and the oil distribution groove is located below the through hole, and a lower guiding end of the first oil-guiding groove and a lower guiding end of the second oil-guiding groove are respectively connected to the oil distribution groove, and the oil distribution groove has an upper end distribution opening and a lower end distribution opening, the upper end distribution opening is located on an inner wall of the through hole. The return channels are recessed in the first side surface and are respectively located on two opposite sides of the first side surface, in which the return channels are connected to the lower end distribution opening.

According to an embodiment of the present invention, the slider has a first oil inlet passage and a second oil inlet passage located on two opposite sides of the slider. An upper guiding end of the first oil-guiding groove is communicated with the first oil inlet passage of the slider, and an upper guiding end of the second oil-guiding groove is communicated with the second oil inlet passage of the slider.

According to an embodiment of the present invention, the return channels are communicated with each other through a connecting passage, and the lower end distribution opening of the oil distribution groove is located on an inner wall of the connecting passage.

According to an embodiment of the present invention, the upper end distribution opening of the oil distribution groove is smaller than the lower end distribution opening.

According to an embodiment of the present invention, the circulator structure further includes a mounting plate. The mounting plate is fixed on the second side surface of the main body through a fixing member, and the mounting plate has at least one carrying portion which is configured to carry a magnet.

According to an embodiment of the present invention, the main body is made of lead containing nylon.

According to the aforementioned object, a slider device is provided. The slider device includes a rail body, a slider, a screw rod, a driving unit, and a pair of the aforementioned circulator structures. The rail body has an accommodating space. The slider is disposed in said accommodating space. The screw rod is passed through said slider, in which the screw rod is configured to drive said slider. The driving unit is configured to drive the screw rod. The circulator structures are respectively disposed on two opposite end surfaces of the slider, and the screw rod is passed through the through holes of the circulator structures.

According to an embodiment of the present invention, the slider has a first oil inlet passage and a second oil inlet passage located on two opposite sides of the slider. The upper guiding end of the first oil-guiding groove is communicated with the first oil inlet passage of the slider, and an upper guiding end of the second oil-guiding groove is communicated with the second oil inlet passage of the slider.

According to an embodiment of the present invention, the return channels are communicated with each other through a connecting passage, and the lower end distribution opening of the oil distribution groove is located on an inner wall of the connecting passage.

According to an embodiment of the present invention, the upper end distribution opening of the oil distribution groove is smaller than the lower end distribution opening.

According to an embodiment of the present invention, the slider device further includes a dust proof belt covering the accommodating space of the rail body and located on the slider. The circulator structure further includes a mounting plate, in which the mounting plate is fixed on the second side surface of the main body through a fixing member, and the mounting plate has at least one carrying portion which is configured to carry a magnet, and the magnet is configured to attract the dust proof belt.

According to an embodiment of the present invention, the main body is made of lead containing nylon.

According to an embodiment of the present invention, the slider has a height and a width which is smaller than or equal to 32 mm.

According to an embodiment of the present invention, there are plural balls disposed in the return channels, and each of the balls has a diameter ranging from 1 mm to 3 mm.

According to an embodiment of the present invention, the slider device further includes a screw nut, a fixing pin and two fixing members. The screw nut is disposed in the slider and put around the screw rod. The fixing pin includes a plate portion and a rod portion. The plate portion has two attachment holes respectively located on two opposite sides of the plate portion. The rod portion is connected to the plate portion, in which the rod portion is located between the attachment holes, and the rod portion is passed through a top portion of the slider and is fixed on the screw nut, wherein a connection line among the rod portion and the attachment holes is parallel to a sliding direction of the slider. The fixing members are respectively fixed in the attachment holes, so as to fix the fixing pin on the slider.

From the aforementioned embodiments of the present invention, it can be known that the circulator structure of the present disclosure has the design of the Y-like groove to be directly and integrally communicated with the oil passage of the slider, thereby directly distributing the lubricating oil to the through hole and the return channels, so as to achieve the purpose of rapid and uniform lubricating oil distribution. With this design, not only can the sizes of components in the slider device be reduced, but the use of some components can also be omitted, thereby simplifying the assembly process and decreasing the manufacturing cost of the entire slider device.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Reference will now be made in detail to the present embodiments of the invention, examples of which are illustrated in the accompanying drawings. Wherever possible, the same reference numbers are used in the drawings and the description to refer to the same or like parts.

Figure 1:
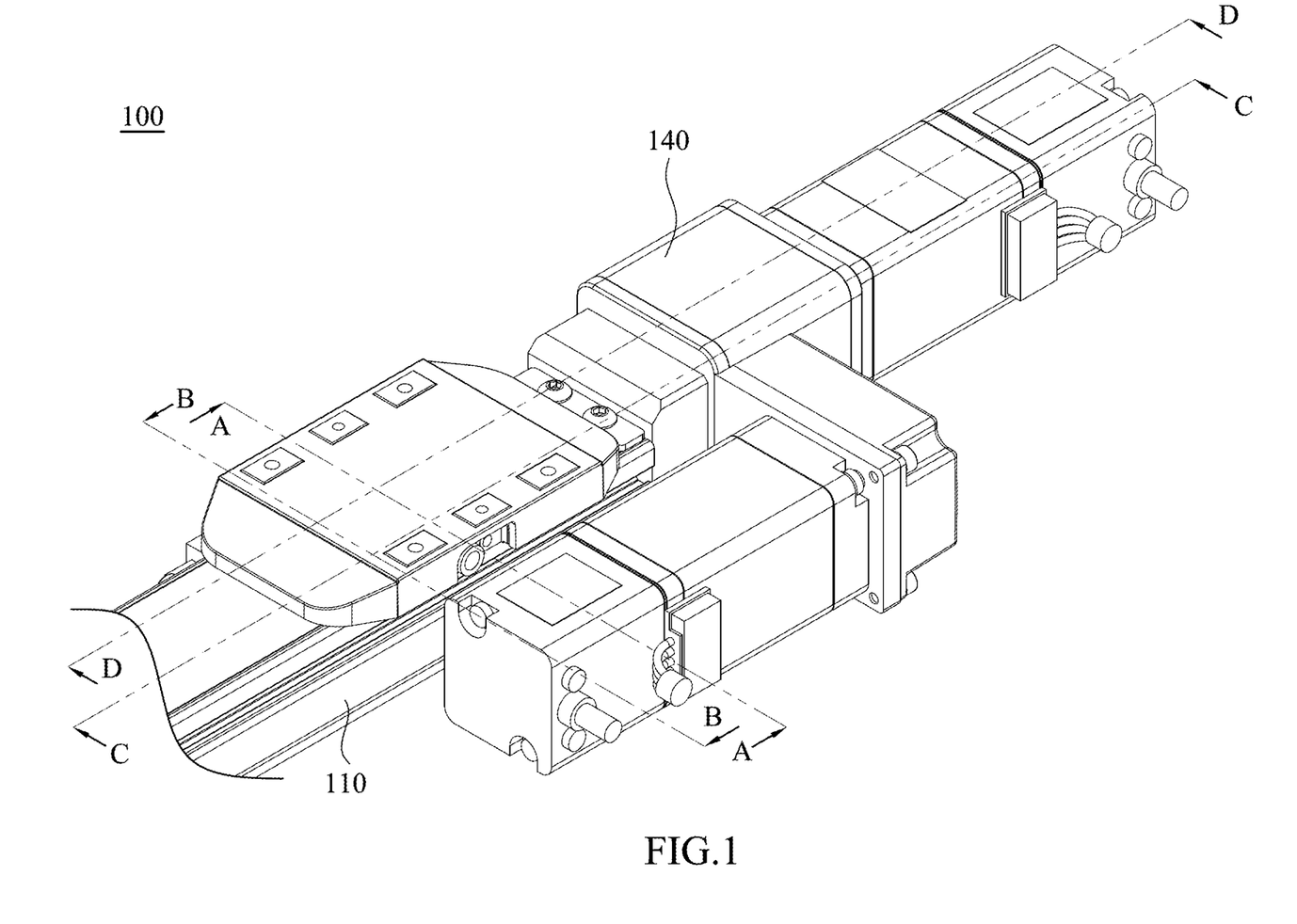
FIG. 1 is a schematic structural diagram showing a slider device in accordance with an embodiment of the present invention.
Figure 2:
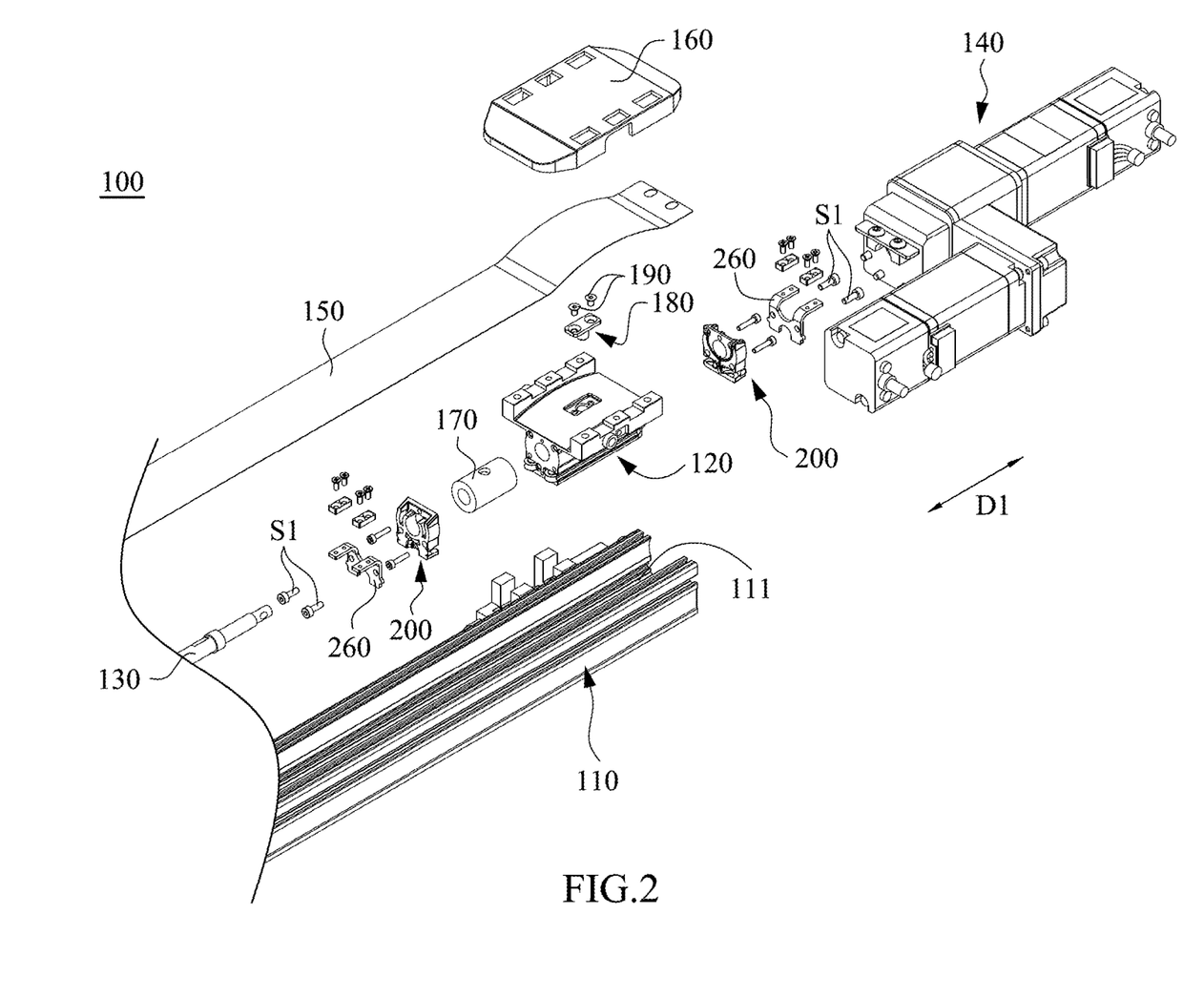
FIG. 2 is a partial exploded view of a slider device in accordance with an embodiment of the present invention.

Simultaneously referring to FIG. 1 and FIG. 2, FIG. 1 and FIG. 2 are a schematic structural diagram and a partial exploded view of a slider device 100 in accordance with an embodiment of the present invention. The slider device 100 of the present embodiment mainly includes a rail body 110, a slider 120, a screw rod 130, a driving unit 140 and a pair of circulator structures 200. The rail body 110 extends along a direction D1 and has an accommodating space 111. The screw rod 130 and the slider 120 are disposed in the accommodating space 111, and the screw rod 130 is passed through the slider 120. The driving unit 140 is connected to the screw rod 130 and is configured to drive the screw rod 130 to rotate, thereby driving the slider 120 to move on the rail body 110 along the direction D1. The circulator structures 200 are respectively disposed on two opposite end surfaces (e.g. an end surface 120a and an end surface 120b) of the slider 120, and the circulator structures 200 are configured to form an oil supply line with the slider 120.

Figure 3:
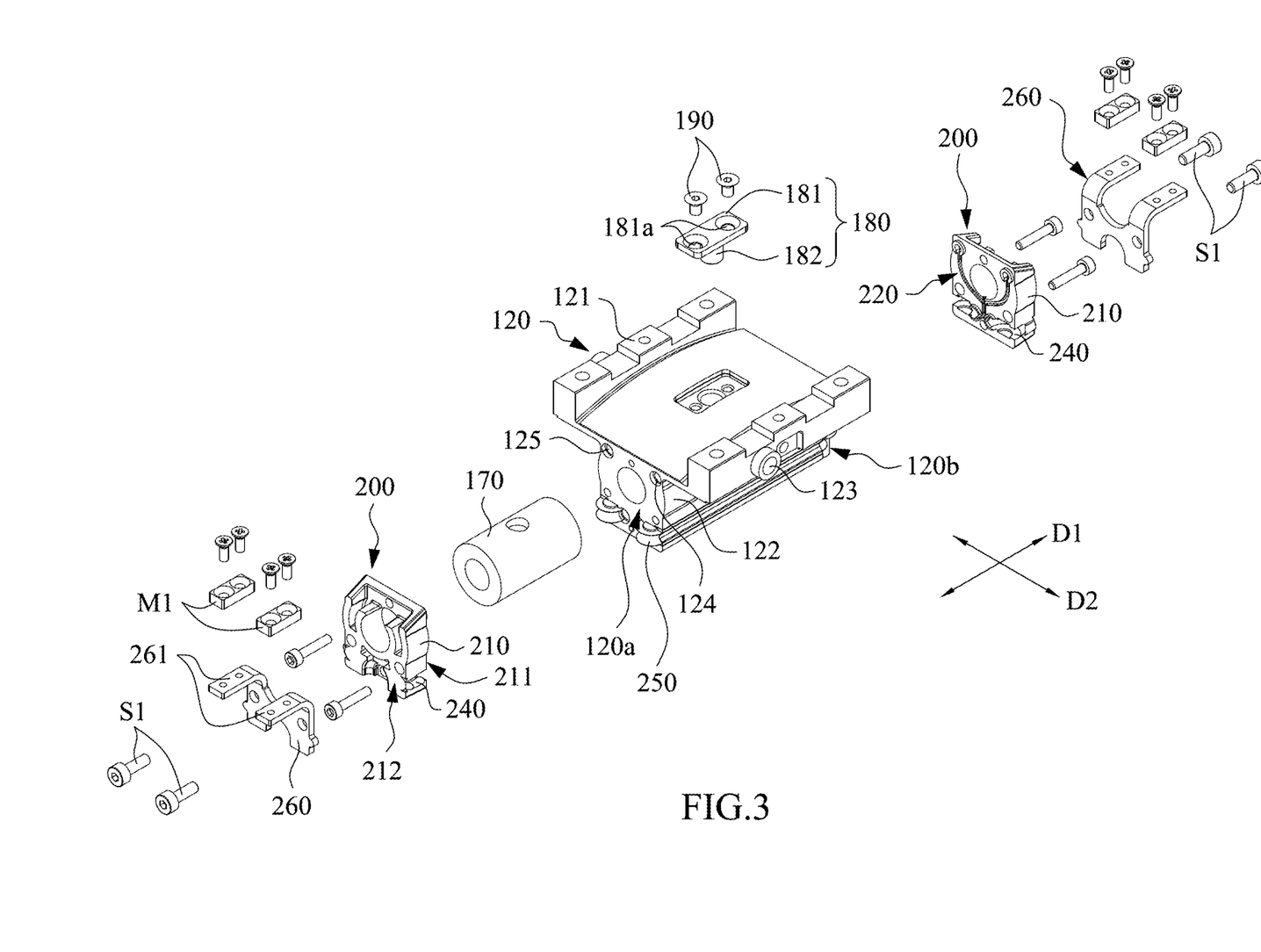
FIG. 3 is a exploded view showing parts of a slider device in accordance with an embodiment of the present invention.
Figure 4:
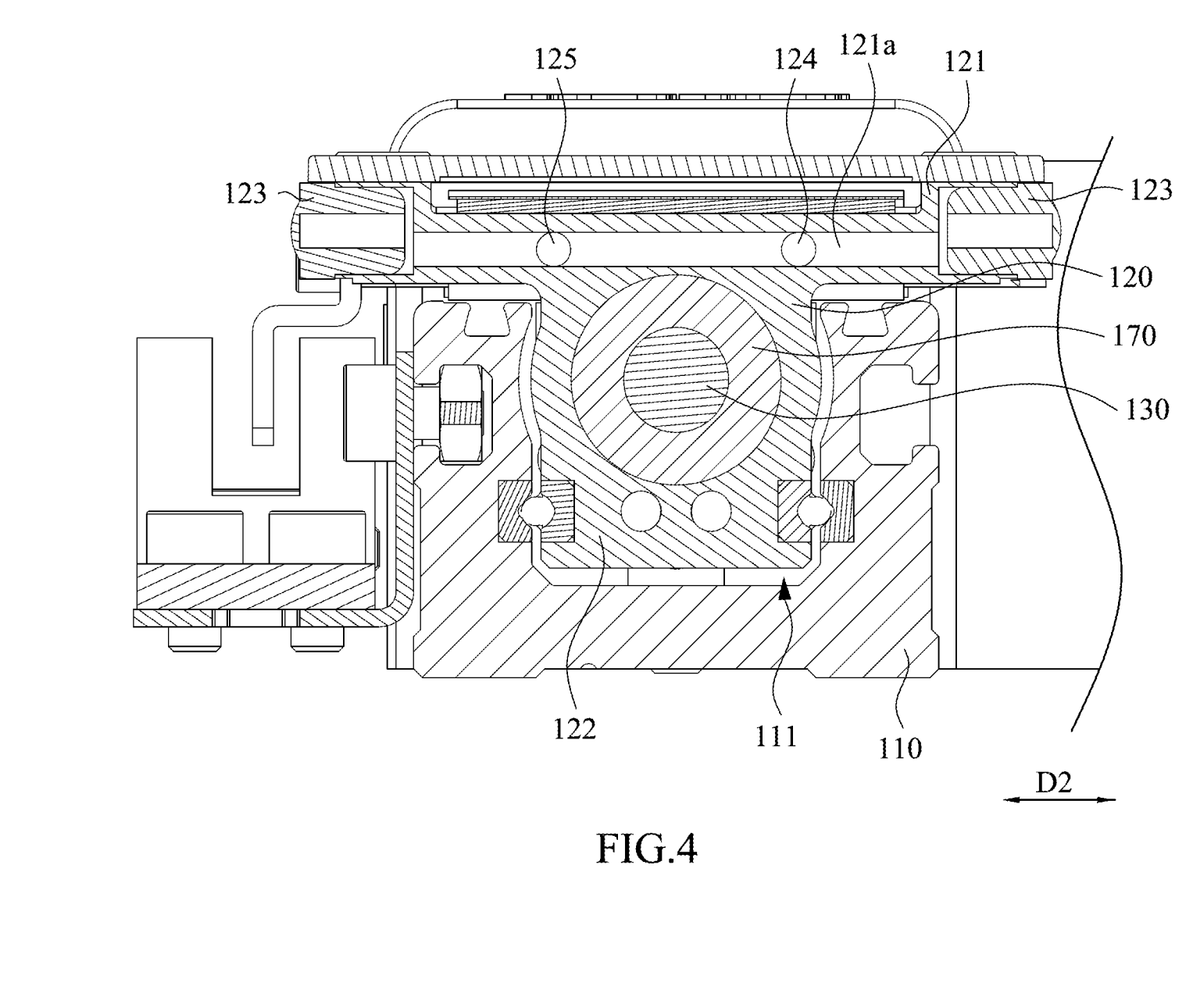
FIG. 4 is a schematic cross-sectional view taken along a line A-A in FIG. 1.
Figure 5:
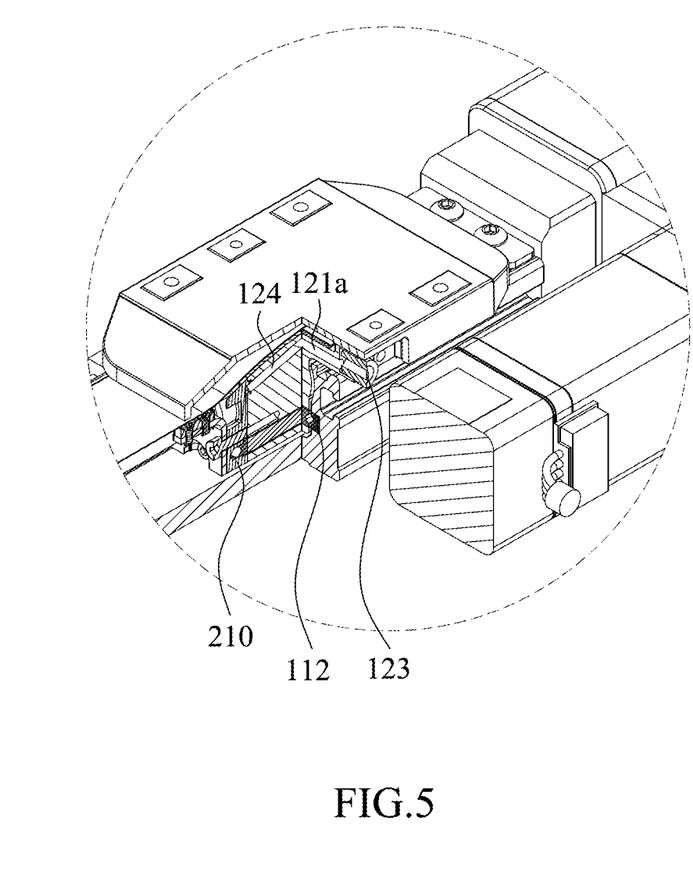
FIG. 5 is a partial cross-sectional view showing a slider device in accordance with an embodiment of the present invention.

Simultaneously referring to FIG. 3 to FIG. 5, FIG. 3 is a exploded view showing parts of the slider device 100 in accordance with an embodiment of the present invention, FIG. 4 is a schematic cross-sectional view taken along a line A-A in FIG. 1, and FIG. 5 is a partial cross-sectional view showing the slider device 100 in accordance with an embodiment of the present invention. Two opposite side surfaces of the slider 120 along the direction D1 are the end surface 120a and the end surface 120b, and the circulator structures 200 are respectively disposed on the end surface 120a and the end surface 120b. The slider 120 has an upper portion 121 and a lower portion 122, in which the lower portion 122 is located in the accommodating space 111 of the rail body 110 and the screw rod 130 is passed through the lower portion 122, and the upper portion 121 is disposed on a top surface of the rail body 110. As shown in FIG. 4, the slider 120 has an oil injecting passage 121a extends along a direction D2 from one side surface of the upper portion 121 to the other side surface of the upper portion 121, and there are two oil nozzles 123 respectively disposed on two opposite ends of the oil injecting passage 121a. In addition, the slider 120 further includes a first oil inlet passage 124 and a second oil inlet passage 125. One end of the first oil inlet passage 124 is communicated with the oil injecting passage 121a (as shown in FIG. 4 and FIG. 5), and the other end of the first oil inlet passage 124 is opened on the end surface 120a of the slider 120 (as shown in FIG. 3). Similarly, one end of the second oil inlet passage 125 is communicated with the oil injecting passage 121a (as shown in FIG. 4), and the other end of the second oil inlet passage 125 is opened on the end surface 120a of the slider 120 (as shown in FIG. 3). Therefore, after the lubricating oil enters the oil injecting passage 121a from the oil nozzles 123, the lubricating oil will pass through the first oil inlet passage 124 and the second oil inlet passage 125 to enter the circulator structures 200.

Figure 6:
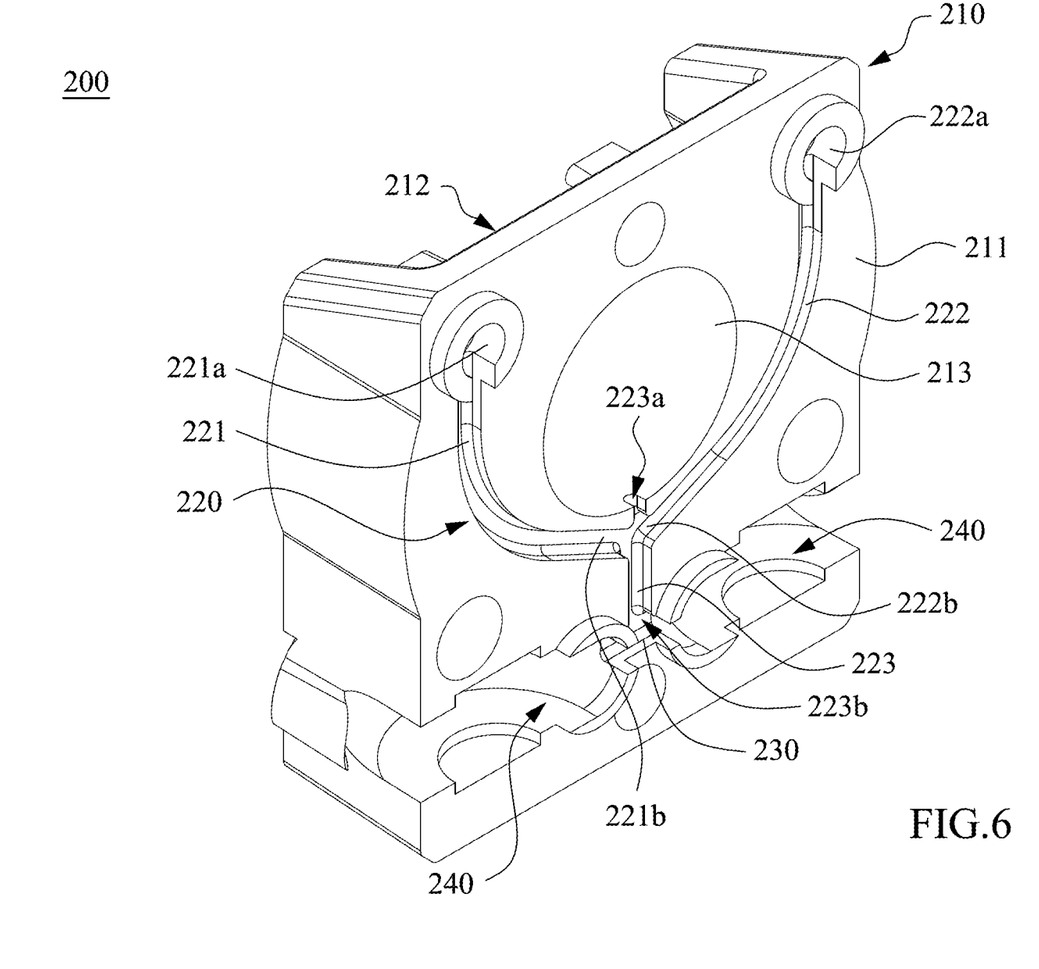
FIG. 6 is a schematic structural diagram showing a circulator structure in accordance with an embodiment of the present invention.
Figure 7:
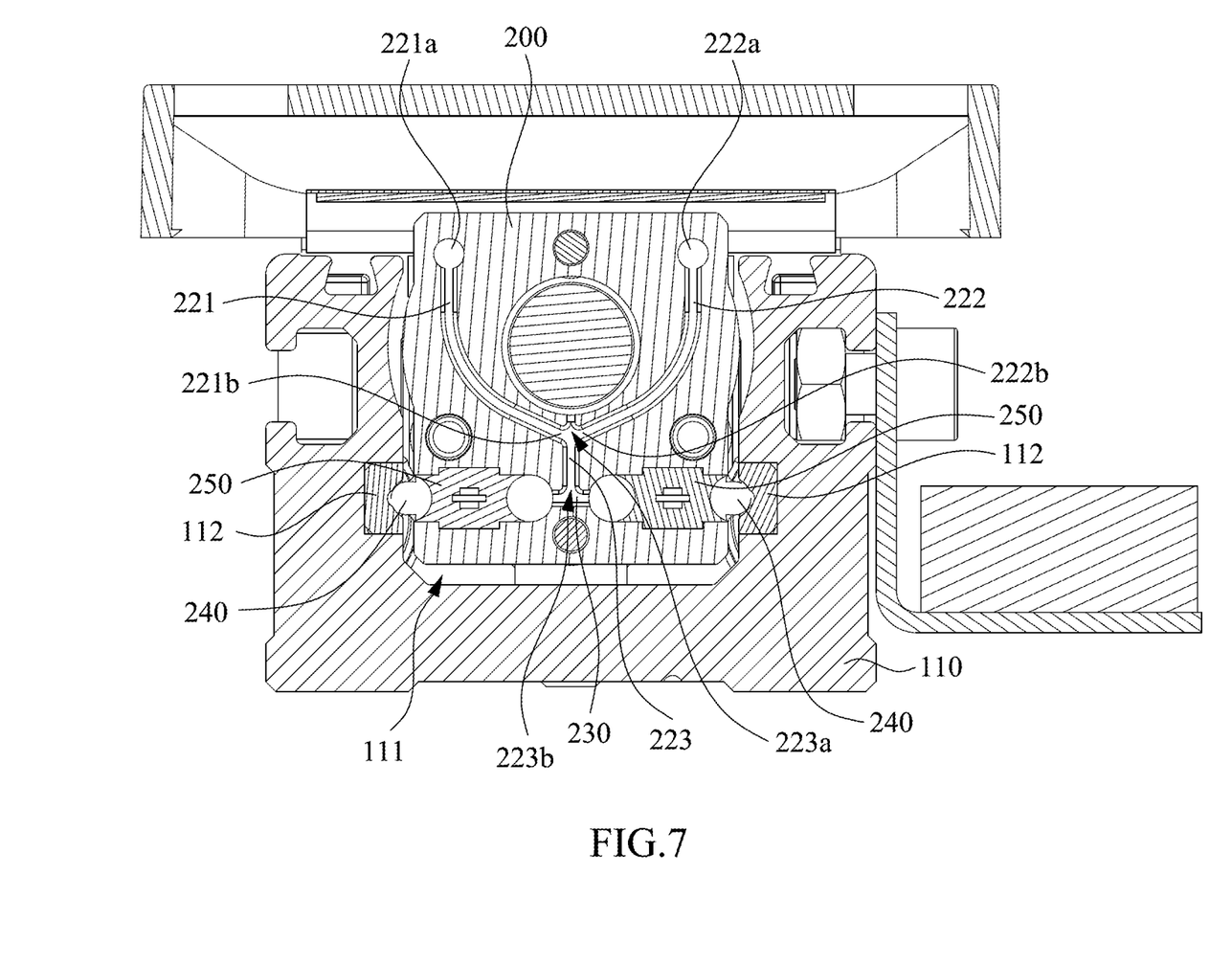
FIG. 7 is a schematic cross-sectional view taken along a line B-B in FIG.

Referring to FIG. 3, FIG. 6 and FIG. 7, FIG. 6 is a schematic structural diagram showing the circulator structure 200 in accordance with an embodiment of the present invention, and FIG. 7 is a schematic cross-sectional view taken along a line B-B in FIG. 1. The circulator structure 200 of the present embodiment mainly includes a main body 210, a Y-like groove 220, a connecting passage 230 and a pair of return channels 240. The main body 210 has a first side surface 211, a second side surface 212 and a through hole 213. The first side surface 211 is configured to be connected to a surface of the slider 120, and the second side surface 212 is opposite to the first side surface 211. The through hole 213 extends from the first side surface 211 to the second side surface 212. In the present embodiment, the Y-like groove 220 is recessed into the first side surface 211, and the Y-like groove 220 includes a first oil-guiding groove 221, a second oil-guiding groove 222 and an oil distribution groove 223. As shown in FIG. 6 and FIG. 7, the first oil-guiding groove 221 and the second oil-guiding groove 222 is located at two opposite sides of the through hole 213, and the oil distribution groove 223 is located below the through hole 213. The first oil-guiding groove 221 has an upper guiding end 221a and a lower guiding end 221b, and the upper guiding end 221a is communicated to the first oil inlet passage 124 of the slider 120 (as shown in FIG. 3), and the lower guiding end 221b is communicated to the oil distribution groove 223. Similarly, the second oil-guiding groove 222 has an upper guiding end 222a and a lower guiding end 222b, and the upper guiding end 222a is communicated to the second oil inlet passage 125 of the slider 120 (as shown in FIG. 3), and the lower guiding end 222b is communicated to the oil distribution groove 223. The upper guiding end 221a of the first oil-guiding groove 221 and the upper guiding end 222a of the second oil-guiding groove 222 respectively extend from the two opposite sides of the through hole 213 to the oil distribution groove 223 that is located below the through hole 213, so that the first oil-guiding groove 221, the second oil-guiding groove 222 and the oil distribution groove 223 are formed as the Y-like groove 220.

Referring to FIG. 3, FIG. 6 and FIG. 7 again, the return channels 240 are recessed into the first side surface 211 and are respectively located at two opposite sides of the first side surface 211. The connecting passage 230 is disposed below the oil distribution groove 223 and is located between the return channels 240, and the connecting passage 230 is communicated with the return channels 240. The oil distribution groove 223 has an upper end distribution opening 223a and a lower end distribution opening 223b, in which the upper end distribution opening 223a is communicated with the through hole 213, and the lower end distribution opening 223b is communicated with the return channels 240. In one embodiment, the oil distribution groove 223 and the upper end distribution opening 223a is located at the inner wall of the through hole 213, and the lower end distribution opening 223b is located at the inner wall of the connecting passage 230. Therefore, the lubricating oil from the first oil inlet passage 124 and the second oil inlet passage 125 of the slider 120 can respectively flow along the first oil-guiding groove 221 and the second oil-guiding groove 222 of the Y-like groove 220 to coverage at the oil distribution groove 223, such that the lubricating oil can be further transmitted to the through hole 213 and the return channel 240 of the oil distribution groove 223 respectively. In one embodiment, the upper end distribution opening 223a of the oil distribution groove 223 may be designed to be smaller than the lower end distribution opening 223b, such that when the oil distribution groove 223 is filled with lubricating oil, one portion of the lubricating oil can be output from the upper end distribution opening 223a to the through hole 213 with a greater pressure, and the other portion of the lubricating oil can be output from the lower end distribution opening 223b by gravity to the connecting passage 230 and the return channel 240. From the above it can be known that, the circulator structure 200 of the present disclosure has the design of the Y-like groove 220 to be directly and integrally communicated with the oil passage of the slider 120, thereby directly distributing the lubricating oil in the slider 120 to the through hole 213 and the return channel 240, so as to achieve a purpose of rapid and uniform lubricating oil distribution. With this design, the overall oil passage design of the slider device 100 can be simplified and the number of components of the slider device 100 also can be decreased, thereby reducing the volume of the entire slider device 100. In one example, the size of the slider 120 can be reduced to less than or equal to about 32 mm in height and width respectively, so as to meet different design requirements.

As shown in FIG. 7, in the present embodiment, the circulator structure 200 further comprises returning members 250 and plural balls (not shown) which are disposed in the return channels 240. When the slider 120 slides on the rail body 110, the balls can roll from returning members 250 of the slider 120 to a location between the slider 120 and the rail body 110 and further return to the interior of the slider 120, thereby reducing a friction between the slider 120 and the rail body 110. In some embodiment, the main body 210 of the circulator structure 200 is made of lead containing nylon which can absorb noise generated by the collision between the balls and the circulator structure 200. In one embodiment, each of the balls has a diameter ranging from 1 mm to 3 mm, which can be collaborated with the slider 120 with smaller volume. In other embodiments, embedded rails 112 are disposed on the inner wall of the rail body 110 corresponding to the disposition location of the balls as a ball sliding track, thereby enhancing load capacity and strength of the rail body 110.

Figure 8:
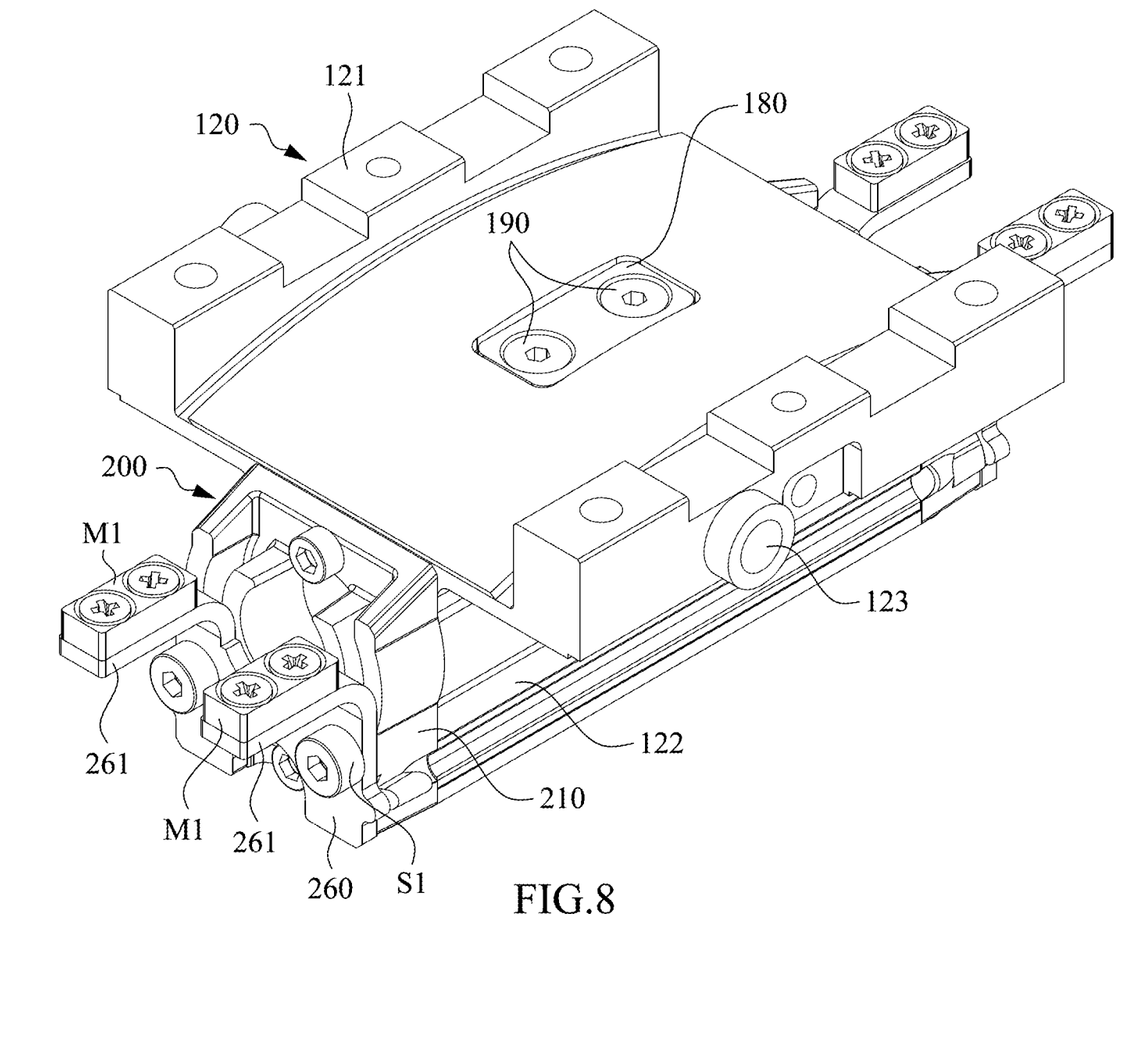
FIG. 8 is a schematic assembly view showing parts of a slider device in accordance with an embodiment of the present invention.
Figure 9:
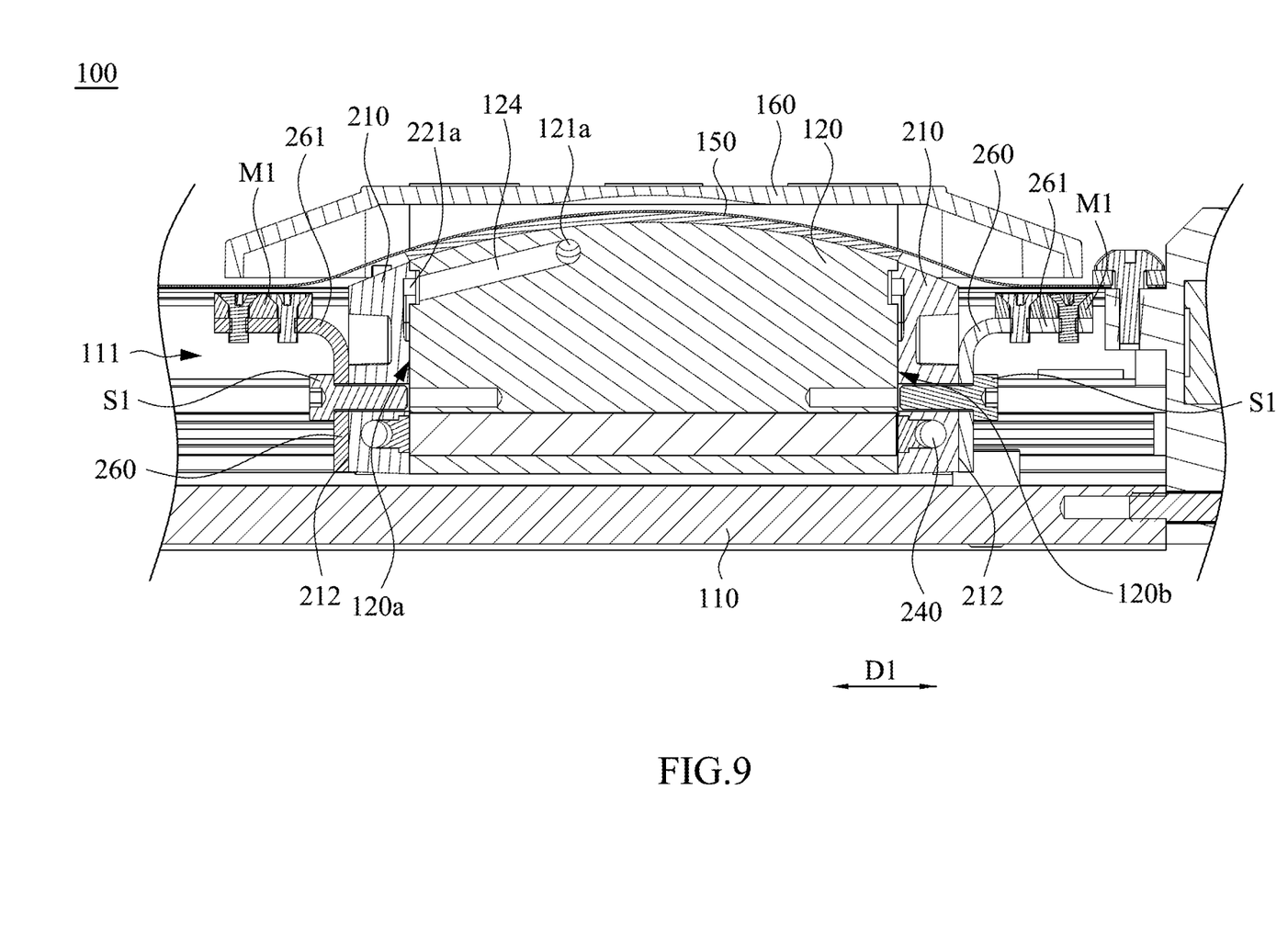
FIG. 9 is a schematic cross-sectional view taken along a line C-C in FIG. 1.

Simultaneously referring to FIG. 2, FIG. 8 and FIG. 9, FIG. 8 is a schematic assembly view showing parts of the slider device 100 in accordance with an embodiment of the present invention, and FIG. 9 is a schematic cross-sectional view taken along a line C-C in FIG. 1. In one embodiment, the circulator structure 200 further includes a mounting plate 260. The mounting plate 260 is fixed on the second side surface 212 of the main body 210 (as shown in FIG. 9 and FIG. 3) by a fixing member S1 (as shown in FIG. 9). In the present embodiment, the mounting plate 260 is an H-shaped bending structure. More specifically, the mounting plate 260 is L-shaped as viewed from a side, and the mounting plate 260 has a carrying portion 261. The carrying portion 261 is configured to carry a magnet M1. In the present embodiment, the slider device 100 further includes a dust proof belt 150 and a top cover 160. In one example, the dust proof belt 150 is a steel belt. The dust proof belt 150 is located on a top surface of the slider 120 and extends along the direction D1 to cover the accommodating space 111 of the rail body 110. The top cover 160 is disposed on the slider 120 to position the dust proof belt 150 between the top cover 160 and the slider 120. Therefore, when the slider 120 slides on the rail body 110, the magnet M1 disposed on the mounting plate 260 can attract the dust proof belt 150, so as to ensure the dust proof belt 150 does not shift or wrap, thereby maintaining the dust proof belt 150 adhere to the rail body 110.

Figure 10:
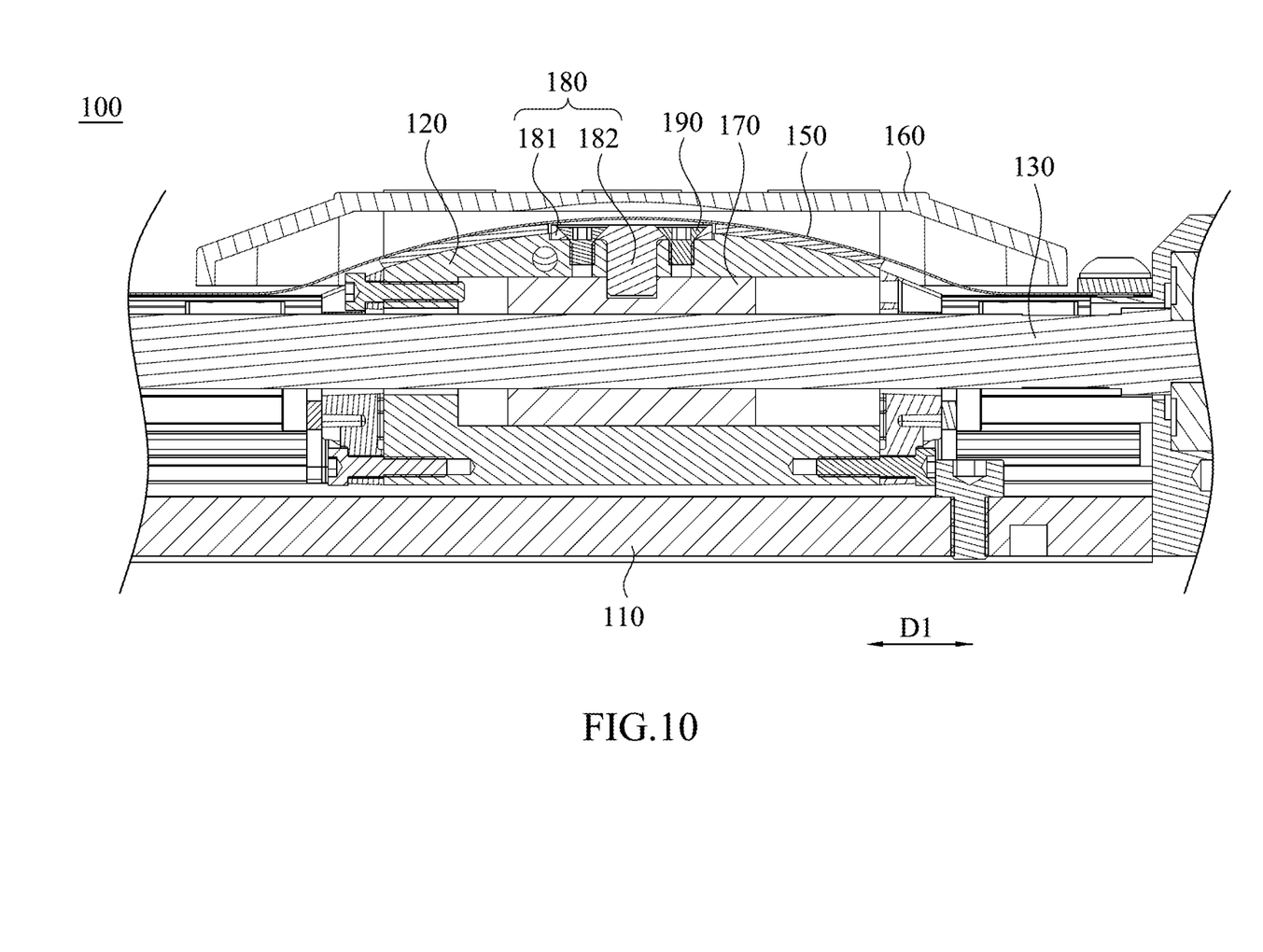
FIG. 10 is a schematic cross-sectional view taken along a line D-D in FIG. 1.

Simultaneously referring to FIG. 3 and FIG. 10, FIG. 10 is a schematic cross-sectional view taken along a line D-D in FIG. 1. In some embodiments, the slider device 100 further includes a screw nut 170, a fixing pin 180 and two fixing members 190. The screw nut 170 is disposed inside of the slider 120 and is put around the screw rod 130. The fixing pin 180 is passed through a top portion of the slider 120 and is fixed on the screw nut 170 so as to achieve an object of positioning the screw nut 170. More specifically, the fixing pin 180 includes a plate portion 181 and a rod portion 182 connected to the plate portion 181. There are two attachment holes 181a disposed on two opposite sides of the plate portion 181, and the rod portion 182 is disposed between the attachment holes 181a. Therefore, after the rod portion 182 of the fixing pin 180 is passed through the slider 120, the rod portion 182 is inserted into the screw nut 170. Then, the two fixing members 190 are respectively screwed onto the top portion of the slider 120 through the attachment holes 181a located on two opposite sides of the rod portion 182, thereby securing the fixing pin 180 on the slider 120 tightly. In addition, in the present embodiment, the rod portion 182 and the attachment holes 181a are arranged along a direction which is parallel to the direction D1. In other words, an extending direction of the plate portion 181 of the fixing pin 180 is parallel to the sliding direction of the slider 120, such that a lateral force on the fixing pin 180 resulting from the vibration of the slider 120 is reduced, thereby preventing the fixing pin 180 from loosening off.

It is noted that, in the embodiment of FIG. 1, the driving unit 140 is a belt-type driving unit, and embodiments of the present disclosure are not limited thereto. In other embodiments, the driving unit 140 can be a direct connection-type driving unit which uses a coupling to directly connect the screw rod to a shaft end of a motor of the driving unit so as to drive the screw rod.

From the aforementioned embodiments of the present invention, it can be known that the circulator structure of the present disclosure has the design of the Y-like groove to be directly and integrally communicated with the oil passage of the slider, thereby directly distributing the lubricating oil to the through hole and the return channels, so as to achieve the purpose of rapid and uniform lubricating oil distribution. With this design, not only can the sizes of components in the slider device be reduced, but the use of some components can also be omitted, thereby simplifying the assembly process and decreasing the manufacturing cost of the entire slider device.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A circulator structure, which is suitable to be disposed on a slider, so as to form an oil supply line with said slider, wherein said circulator structure comprises:
a main body having a first side surface, a second side surface opposite to said first side surface and a through hole, wherein said first side surface is configured to be connected to said slider, and said through hole extends from said first side surface to said second side surface;
a Y shaped groove recessed into said first side surface, wherein said Y shaped groove comprises a first oil-guiding groove, a second oil-guiding groove and an oil distribution groove, wherein said first oil-guiding groove and said second oil-guiding groove are respectively located at two opposite sides of said through hole, and oil distribution groove is located below said through hole, and a lower guiding end of said first oil-guiding groove and a lower guiding end of said second oil-guiding groove are respectively connected to said oil distribution groove, and said oil distribution groove has an upper end distribution opening and a lower end distribution opening, said upper end distribution opening is located on an inner wall of said through hole; and
a pair of return channels recessed in said first side surface and respectively located on two opposite sides of said first side surface, wherein said return channels are connected to said lower end distribution opening.

2. The circulator structure of claim 1, wherein
said slider has a first oil inlet passage and a second oil inlet passage respectively located on two opposite sides of said slider; and
an upper guiding end of said first oil-guiding groove is in communication with said first oil inlet passage of said slider, and an upper guiding end of said second oil-guiding groove in communication with said second oil inlet passage of said slider.

3. The circulator structure of claim 1, wherein said return channels are in communication with each other through a connecting passage, and said lower end distribution opening of said oil distribution groove is located on an inner wall of said connecting passage.

4. The circulator structure of claim 1, wherein said upper end distribution opening of said oil distribution groove is smaller than said lower end distribution opening.

5. The circulator structure of claim 1, further comprising a mounting plate, wherein said mounting plate is fixed on said second side surface of said main body through a fixing member, and said mounting plate has at least one carrying portion which is configured to carry a magnet.

6. The circulator structure of claim 1, wherein said main body is made of lead containing nylon.

7. A slider device, comprising:
a rail body having an accommodating space;
a slider disposed in said accommodating space;
a screw rod passed through said slider, wherein said screw rod is configured to drive said slider;
a driving unit configured to drive said screw rod; and
a pair of circulator structures as recited in claim 1, wherein said circulator structures are respectively disposed on two opposite end surfaces of said slider, and said screw rod is passed through said through holes of said circulator structures.

8. The slider device of claim 7, wherein
said slider has a first oil inlet passage and a second oil inlet passage respectively located on two opposite sides of said slider; and
an upper guiding end of said first oil-guiding groove is in communication with said first oil inlet passage of said slider, and an upper guiding end of said second oil-guiding groove is in communication with said second oil inlet passage of said slider.

9. The slider device of claim 7, wherein said return channels are in communication with each other through a connecting passage, and said lower end distribution opening of said oil distribution groove is located on an inner wall of said connecting passage.

10. The slider device of claim 7, wherein said upper end distribution opening of said oil distribution groove is smaller than said lower end distribution opening.

11. The slider device of claim 7, further comprising a dust proof belt covering said accommodating space of said rail body and located on said slider, wherein
said circulator structure further comprises a mounting plate, wherein said mounting plate is fixed on said second side surface of said main body through a fixing member, and said mounting plate has at least one carrying portion which is configured to carry a magnet, and said magnet is configured to attract said dust proof belt.

12. The slider device of claim 7, wherein said main body is made of lead containing nylon.

13. The slider device of claim 7, wherein said slider has a height and a width which are smaller than or equal to 32 mm.

14. The slider device of claim 7, wherein there are a plurality of balls disposed in said return channels, and each of said balls has a diameter ranging from 1 mm to 3 mm.

15. The slider device of claim 7, further comprising:
- a screw nut disposed in said slider and put around said screw rod;
- a fixing pin comprising:
  - a plate portion having two attachment holes respectively located on two opposite sides of said plate portion; and
  - a rod portion connected to said plate portion, wherein said rod portion is located between said attachment holes, and said rod portion is passed through a top portion of said slider and is fixed on said screw nut, wherein a connection line among said rod portion and said attachment holes is parallel to a sliding direction of said slider; and
- two fixing members respectively fixed in said attachment holes, so as to fix said fixing pin on said slider.

\* \* \* \* \*